United States Patent [19]

MacKay

[11] 4,298,190
[45] Nov. 3, 1981

[54] APPARATUS FOR GASEOUS REDUCTION OF METAL ORES WITH COOLING LOOP

[75] Inventor: Patrick W. MacKay, Monterrey, Mexico

[73] Assignee: Fierro Esponja, S.A., Monterrey, Mexico

[21] Appl. No.: 9,684

[22] Filed: Feb. 5, 1979

Related U.S. Application Data

[60] Continuation of Ser. No. 833,695, Sep. 15, 1977, abandoned, which is a division of Ser. No. 635,655, Nov. 26, 1975, Pat. No. 4,067,728, which is a continuation of Ser. No. 516,095, Oct. 18, 1974, abandoned.

[51] Int. Cl.³ .............................................. C21B 13/02
[52] U.S. Cl. ......................................... 266/156; 75/35
[58] Field of Search ............... 266/159, 156, 197, 157, 266/158; 75/35

[56] References Cited

U.S. PATENT DOCUMENTS 3,423,201  1/1969  Celada et al. ............................ 75/35
3,890,142  6/1975  Celada et al. ............................ 75/35

Primary Examiner—M. J. Andrews
Attorney, Agent, or Firm—Curtis, Morris & Safford

[57] ABSTRACT

An improvement in a method for the batchwise gaseous reduction of iron ore to sponge iron in a multiple unit reactor system including a cooling reactor and a series of reduction reactors. Reduction is effected with a gas composed largely of carbon monoxide and hydrogen generated by reforming a mixture of steam and natural gas or other gaseous hydrocarbons at an elevated temperature. The reducing gas pressure drop through the system is decreased by using an out-of-line cooling reactor and cooling gas loop, thereby making it feasible to use three or more reduction reactors in series and thus enhance the efficiency of utilization of the reducing gas. Also the use of an out-of-line cooling reactor permits independent control of both the gas flow rate and gas composition in the cooling loop.

8 Claims, 1 Drawing Figure

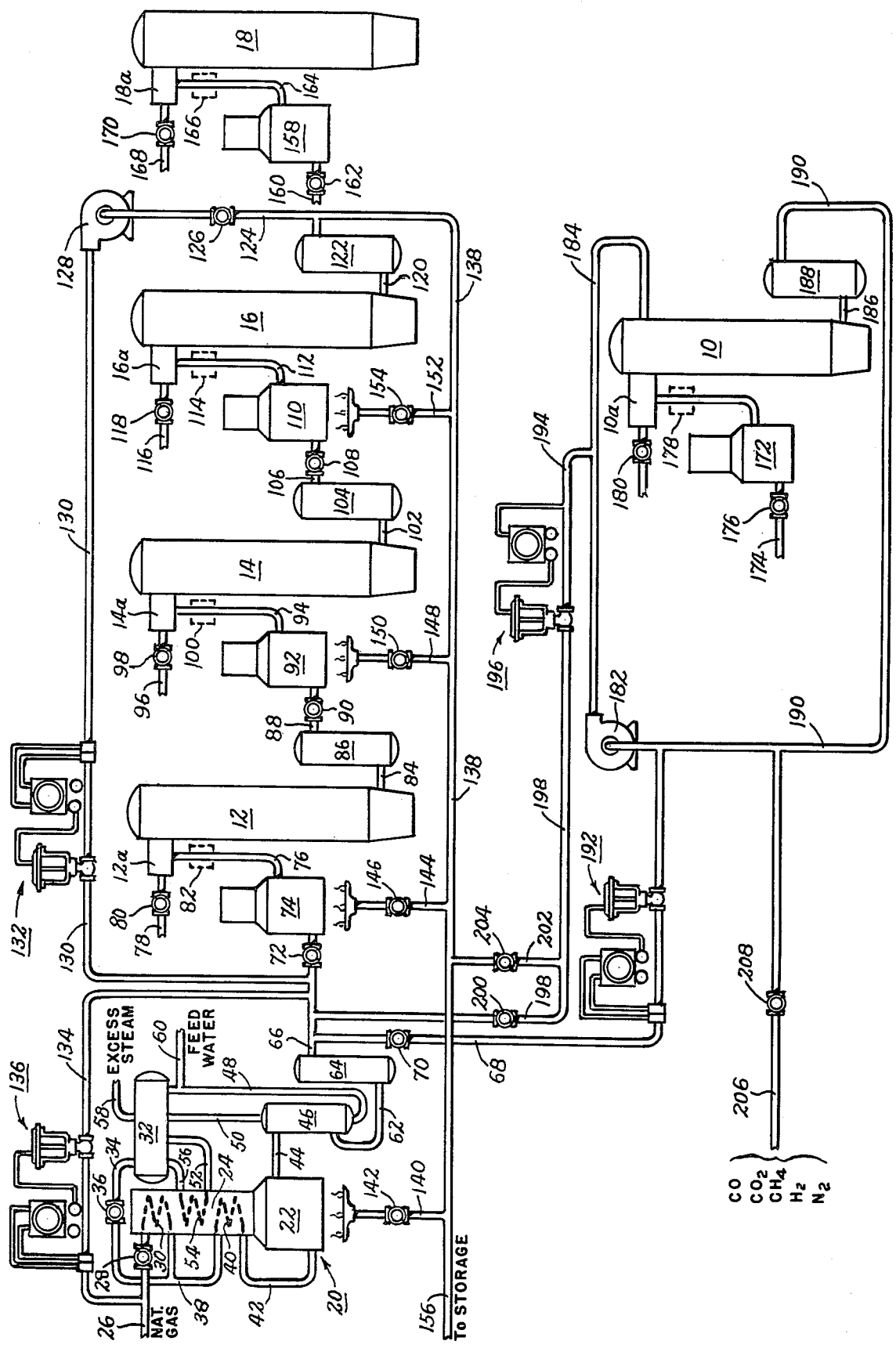

APPARATUS FOR GASEOUS REDUCTION OF METAL ORES WITH COOLING LOOP

This is a continuation of application Ser. No. 833,695 filed Sept. 15, 1977 now abandoned which is a divisional of application Ser. No. 635,655 filed Nov. 26, 1975, U.S. Pat. 4,067,728 which is a continuation of abandoned application Ser. No. 516,095 filed Oct. 18, 1974.

This invention relates to the gaseous reduction of metal oxides at elevated temperatures, and more particularly, to an improved method of operating a multi-unit reactor system for effecting such a reduction process. The invention is especially useful in connection with the direct gaseous reduction of iron oxide ores in lump or pellet form to sponge iron and will be illustratively described in connection with this use, although as the description proceeds, it will become apparent that the invention can be equally well used in processes wherein metal oxide ores other than iron oxides are reduced.

In one of its aspects the present invention comprises an improvement in a known type of semi-continuous process for producing sponge iron wherein a multiple unit reactor system is used in which separate bodies of ferrous material are treated simultaneously. A process of this type is disclosed in Celada U.S. Pat. No. 2,900,247; Celada et al. U.S. Pat. No. 3,423,201; and Mader et al. U.S. Pat. Nos. 3,136,623; 3,136,624 and 3,136,625. The principal operations carried out in a reactor system of this type are (1) reduction of the ore to sponge iron, (2) cooling of the reduced ore and (3) discharging of the sponge iron from a reactor and recharging it with fresh iron ore to be reduced. Reduction is effected by a reducing gas which is commonly a mixture largely composed of carbon monoxide and hydrogen. The gas is typically generated by the catalytic conversion of a mixture of steam and methane into carbon monoxide and hydrogen in a catalytic reformer of known type according to the equation $$CH_4 + H_2O \rightarrow CO + 3H_2$$

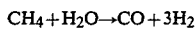

The effluent gas from the reformer is cooled and passed successively through a cooling reactor and one or more reduction reactors. During the cooling and reduction stages an additional reactor, sometimes called the charging reactor, containing previously cooled reduced ore in the form of sponge is isolated from the system so that the sponge iron can be discharged from the reactor and the reactor charged with fresh ore. The reactor system is provided with suitable switching valves whereby at the end of each cycle the gas flow can be shifted to cause the cooling stage reactor to become the charting reactor, the last stage reduction reactor to become the cooling reactor and the charging reactor to become the first stage reduction reactor.

Since the reduction reactors of such a system are connected in series in respect to gas flow, it is evident that the quantity of fresh reducing gas required to produce a given weight of reduced ore having a specified percentage reduction can be decreased by increasing the number of reduction reactors of the series. However, the pressure drop that occurs as the reducing gas passes through the body of metal-bearing material in each reactor establishes a practical limit to the number of reactors that can be used. For this reason, commercial plants, like the systems illustrated in the Celada et al. and Mader et al. patents referred to above, have commonly comprised a cooling reactor and two reduction reactors. If a third reduction reactor is incorporated in such a system, the reducing gas flow decreases to an unacceptably low value, unless other changes in operating conditions or equipment are made which in turn produce other undesirable effects.

It has been further found that in prior systems of this type wherein the cooled reducing gas is initially fed to the cooling reactor, there is a tendency, particularly during the later stages of the cooling operation, for the reforming reaction referred to above to go in the reverse direction, namely, for the carbon monoxide and hydrogen to combine to form methane and water vapor. Since this reverse reaction is exothermic, it tends to retard cooling of the sponge iron during the later portion of the cooling cycle.

Moreover, the reduced ore in the cooling reactor, while consisting largely of sponge iron, still contains a certain amount of unreduced oxide and hence a certain amount of reduction occurs during passage of cooling gas through the cooling reactor with the result that the gas flowing on to the reduction reactor has a somewhat lower reducing quality than the effluent gas from the reformer.

As disclosed in Celada et al. U.S. No. 3,423,201, it is desirable that the reduced sponge iron contain a certain percentage of carbon for effective use in the steel-making process. In the system disclosed in this patent, the desired carbonization is effected by cooling the sponge iron in the cooling reactor in two stages. In the first stage the reducing gas is passed through the cooling reactor at the same rate as it is fed to the first reduction reactor. During this first stage the hot sponge iron cracks a portion of the carbon-containing reducing gas to deposit carbon on the surfaces of the sponge iron particles. After the sponge iron has been cooled to a temperature below the gas-cracking temperature, the effluent gas from the cooling reactor is cooled and recirculated to accelerate the cooling of the sponge iron to approximately room temperature. While this method is effective in achieving deposition of carbon on the sponge iron particles, it is subject to the limitation that the amount of carbon deposited on the sponge iron cannot readily be varied to as great a degree as is desirable in some cases.

It is accordingly an object of the present invention to provide a method of metal oxide ore reduction of the general type disclosed in the above-identified patents wherein the reverse-reforming within the cooling reactor referred to above can be inhibited or suppressed. It is another object of the invention to provide a method of metal oxide ore reduction of this general type wherein the decrease in the quality of the reducing gas due to reduction of residual unreduced ore in the sponge iron in the cooling reactor does not adversely affect the quality of the reducing gas fed to the reduction reactors. It is still another object of the invention to provide a method of metal oxide ore reduction of this general type wherein the amount of carbon deposition of the reduced metal in the cooling reactor can be varied over a relatively wide range. It is a still further object of the invention to provide an improvement in the operation of a multi-reactor reduction system of the type referred to above which makes it practical to use a series of three or more reduction reactors and thereby achieve a more efficient use of the fresh reducing gas produced by the reformer. Other objects of the invention will be in part obvious and in part pointed out hereafter.

In general, the objects of the present invention are achieved by modifying an ore reduction system of the general type referred to above in such manner that the cooling reactor is "out-of-line" with the main flow of reducing gas through the reducing reactors. As indicated above, the use of such an "out-of-line" cooling reactor makes it practical to use three and possibly more reduction reactors in series and thus achieve a more efficient utilization of the fresh reducing gas produced by the reformer. Hence the invention will be illustratively shown and described herein as embodied in a system having three reduction reactors. However, it should be noted that the present "out-of-line" cooling reactor can also be advantageously used in a system comprising fewer than three reduction reactors, since it can be used in such a system to (a) inhibit the reverse-reforming reaction that normally tends to occur in the cooling reactor, (b) eliminate the decrease in reducing gas quality fed to the reduction reactors due to the unreduced ore content of the metal-bearing material being cooled and (c) permit a wider range of variation of the amount of carbon deposition on the reduced ore.

The many objects and advantages of the invention can best be understood and appreciated by reference to the accompanying drawing which illustrates diagrammatically a multiple reactor system capable of carrying out the method of the invention. Referring to the drawing, the system there shown generally comprises the cooling reactor 10, the primary reduction reactor 12, secondary reduction reactor 14, tertiary reduction reactor 16 and the charging reactor 18. The three reduction reactors are connected for series flow of reducing gas through the bodies of ferrous material contained therein. As indicated above, the ore reduction system shown is operated in a cyclic or periodic manner. The ore reduction and cooling operations, as well as the discharging of cooled sponge iron from the charging reactor and the recharging thereof with fresh ore, are carried out simultaneously over a predetermined period of time which may vary depending upon such factors as reducing gas quality and flow rate, reactor size, gas recirculation rates and the like. At the end of each cycle of operations, the reactors are functionally interchanged in such manner that the charging reactor becomes the tertiary reduction reactor, the tertiary reduction reactor becomes the secondary reduction reactor, the secondary reduction reactor becomes the primary reduction reactor, the primary reduction reactor becomes the cooling reactor and the cooling reactor becomes the charging reactor. This functional interchange of the reactors can be effected by an arrangement of valves and piping between the reactors that is known in the art per se and has been omitted from the drawing in order to simplify the showing therein.

The flow of reducing gas through the reduction reactors is generally counter-current. That is to say, the fresh reducing gas is fed to the primary reduction reactor which contains iron-bearing material that has already been partially reduced in the secondary reduction reactor and tertiary reduction reactor in previous cycles. The tertiary reduction reactor, which initially contains fresh ore, is treated with gas that has already passed through the primary and secondary reduction reactors.

Referring now to the left-hand side of the drawing, a reducing gas composed largely of carbon monoxide and hydrogen is generated in a reformer 20 of known construction comprising a gas-heated catalytic converter section 22 and stack 24. Methane, natural gas or other hydrocarbon gas from a suitable source is supplied through a pipe 26 containing a valve 28 and is preheated by passing it through a coil 30 near the top of stack 24 and in heat exchange relation with hot gases flowing through the stack. Hydrocarbon gas, e.g., methane, leaving the coil 30 is mixed with steam in the proper proportions for catalytic conversion into carbon monoxide and hydrogen, typically in a molar ratio of 1:2. More particularly, steam is supplied from a steam drum through a pipe 34 containing a valve 36, and the mixture of steam and methane flows through pipe 38 to a coil 40 in the lower portion of stack 24 wherein it is further preheated. From coil 40 the methane-steam mixture flows through pipe 42 to the converter section 22 of reformer 20, wherein it passes through externally heated catalyst tubes in known manner to effect the desired conversion to carbon monoxide and hydrogen.

From reformer 20 the hot reducing gas flows through pipe 44 to a tubular waste heat boiler 46 wherein its sensible heat is used to generate steam. More particularly, hot water from steam drum 32 flow downwardly through pipe 48 to the bottom of boiler 46 and thence through the tubes thereof, wherein a portion of the water is converted to steam by the heat of the hot reducing gas. The resulting mixture of steam and hot water returns to drum 32 through pipe 50.

In order to utilize further the heat in the hot gases passing through stack 24 of reformer 20, hot water is withdrawn from the bottom of drum 32 through pipe 52, then flow through a coil 54 within stack 24, and is returned to drum 32 through pipe 56. The heat recovered in boiler 46 and the coils in stack 24 is more than enough to generate the steam required for admixture with methane as feed to the reformer. Hence excess steam is available which can be withdrawn from drum 32 through pipe 58 and used for general plant purposes. Make-up feed water for the steam generating system just described is supplied through pipe 60. The use of the steam drum 32, waste heat boiler 46 and coils 30, 40 and 54 within stack 24 substantially improves the overall thermal economy of the system.

The reducing gas, which has been cooled by passage through boiler 46, flows through pipe 62 to a quench cooler 64 wherein it is cooled and dewatered, and then to the reducing gas header 66. A small portion of the reducing gas from header 66 may be withdrawn through the pipe 68 containing the valve 70 and supplied to the cooling reactor system as described hereafter. The main portion of reducing gas flows through pipe 66 which is provided with a valve 72 to a coil heater 74 wherein it is heated to a temperature of the order of 700° to 850° C. Since the desired reducing gas temperature at the entrance to the primary reduction reactor 12 is of the order of 900° to 1100° C., preferably about 1050° C., further heating of the gas leaving coil heater 74 is required, and this further heating is effected in a combustion chamber 12a which communicates with the top of primary reduction reactor 12. More particularly, the effluent gas from heater 74 flows through a pipe 76 to the combustion chamber 12a wherein it is mixed with an oxygen-containing gas supplied through pipe 78 containing valve 80. The oxygen-containing gas may be air or pure oxygen or mixtures thereof but is preferably relatively pure oxygen to avoid introduction of nitrogen into the system. Within the combustion chamber a portion of the hot reducing gas is burned to provide a mixture having the desired relatively high temperature. The combustion chamber 12a may be of the type disclosed in Celada U.S. Pat. No. 2,900,247. If desired, the effluent gas from heater 74 may be further heated in a superheater 82 located in pipe 76. The use of a superheater is especially advantageous in those cases wherein a hydrocarbon gas such as methane is added to the reducing gas between the reformer and the primary reduction reactor as described below, since by using a superheater the amount of oxygen-containing gas supplied to the combustion chamber 12a can be reduced.

The volume of oxygen-containing gas used, as well as its temperature, depends upon the oxygen content of the gas. Thus if air is used as the oxygen-containing gas, it is desirably preheated to a temperature of the order of 700° C. or higher, whereas if oxygen is used, it need not be preheated or may be preheated to a substantially lower temperature. If air is used as the oxygen-containing gas, the volumetric ratio of air to reducing gas with which it is mixed may be as high as 0.4:1 and is typically in the range 0.15:1 to 0.3:1. If, on the other hand, oxygen is used as the oxygen-containing gas, a volumetric ratio within the range 0.05:1 to 0.15:1 will usually give acceptable results.

From the combustion chamber 12a the hot reducing gas enters the top of primary reduction reactor 12 and flows down through the bed of iron-bearing material therein to effect a further reduction of the iron-bearing material to sponge metal. The effluent gas from reactor 12 leaves the reactor near the bottom thereof though a pipe 84 and passes through a quench cooler 86 wherein it is cooled and dewatered and then through a pipe 88 containing a valve 90 to a coil heater 92, similar to the heater 74. Within the heater 92 the gas is again heated to a temperature of the order of 700° to 850° C. and then flows through pipe 94 to the combustion chamber 14a of secondary reduction reactor 14 which is similar to the combustion chamber 12a. Chamber 14a receives a supply of oxygen-containing gas through a pipe 96 containing valve 98. Within combustion chamber 14a a portion of the reducing gas is burned to increase the temperature thereof to the order of 900° to 1100° C. and the resulting heated gas enters secondary reduction reactor 14 and flows downwardly through the bed of iron-bearing material therein to effect a partial reduction thereof. As in the case of the primary reactor system, the secondary reactor system may be provided with a superheater 100 located in pipe 94.

The effluent gas from secondary reduction reactor 14 flows through a pipe 102, quench cooler 104 and pipe 106 containing a valve 108 to a coil heater 110 which is similar to the heaters 74 and 92 and similarly heats the gas passing therethrough. From heater 110 the gas flows through pipe 112, which may be provided with superheater 114 to combustion chamber 16a which communicates with the top of tertiary reduction reactor 16. The combustion chamber 16a is similar to and operates similarly to the combustion chambers 12a and 14a. Chamber 16a is supplied with an oxygen-containing gas through pipe 116 containing valve 118. Hot reducing gas from chamber 16a flows downwardly through the bed of iron-bearing material in tertiary reactor 16 effecting a partial reduction thereof. Effluent gas from the tertiary reactor flows through a pipe 120 to a quench cooler 122 wherein it is cooled and dewatered.

The effluent gas from cooler 122, although it has a relatively low proportion of reducing components, is still useful as a fuel gas. Also in some cases it has been found advantageous to recycle this effluent gas from the tertiary reactor to the primary reactor 12. More particularly, a predetermined regulated fraction of the effluent gas from cooler 122 is caused to flow through pipe 124 containing valve 126 to a pump 128 and thence through pipe 130 containing flow controller 132 to the reducing gas heater 66. In cases where a portion of the effluent gas from tertiary reactor 16 is thus recycled, the quality of the gas supplied to the primary reduction reactor 12 is desirably upgraded by adding methane thereto. Such methane may be added through a pipe 134 which is connected to the methane supply pipe 26 and to header 66. Pipe 134 contains a flow controller 136 which may be adjusted to provide a predetermined regulated flow of methane to the header 66.

The remainder of the effluent gas from tertiary reduction reactor 16 flows to and through a header 138. As indicated in the drawing, at least a portion of this effluent gas may be used as a fuel gas to heat the lower section 22 of reformer 20 and the heaters 74, 92 and 110. More particularly, gas from header 138 can be withdrawn through pipe 140 containing valve 142 to supply fuel for heating the lower section 22 of reformer 20; through pipe 144 containing the valve 146 to supply fuel for heating the heater 74; through pipe 148 containing valve 150 to supply fuel for heating the heater 92; and through pipe 152 containing the valve 154 to supply fuel for heating the heater 110. If the amount of effluent gas from the tertiary reduction reactor is more than that required for recycling through pipe 130 and for heating the reformer and reduction reactor heaters, the excess gas can be removed through pipe 156 to a suitable point of storage or vented to the atmosphere.

Referring now to the right-hand side of the drawing, there is illustrated a charging reactor which is structurally similar to the reduction reactors 12, 14 and 16 and is similarly provided with a heater 158 having an inlet pipe 160 provided with a valve 162. Effluent gas from heater 158 flows through a pipe 164, which may contain a superheater 166, to a combustion chamber 18a. Oxygen-containing gas can be supplied to combustion chamber 18a through a pipe 168 containing a valve 170. However, during the portion of the cycle here being described, the valves 162 and 170 are closed and the charging reactor 18 is isolated from the system so that cooled reduced sponge iron can be discharged from the reactor and a charge of fresh ore introduced therein.

As indicated above, the system of the present invention is characterized by the fact that an out-of-line cooling reactor is used. The cooling reactor 10, like reactors 12, 14 and 16 is provided with a heater 172, inlet pipe 174 containing a valve 176, superheater 178 and combustion chamber 10a, which, during the part of the cycle here being described, are rendered inoperative by closure of valves 176 and 180. As described above, the reactor 10 at the beginning of a reduction cycle contains hot reduced sponge iron from a previous reduction cycle. This bed of hot sponge iron particles is cooled by circulation of a cooling gas therethrough. The cooling gas recirculation system comprises a pump 182 which pumps gas through a pipe 184 to the top of cooling reactor 10. The gas flows downwardly through the body of reduced metal in the reactor and cools it. The effluent gas from the cooling reactor 10 flows through a pipe 186 to a quench cooler 188 wherein it is cooled and dewatered and is then returned through pipe 190 to the suction of pump 182. If it is desired to use reducing gas as a cooling medium for cooling the reduced ore, gas may be withdrawn from header 66 through pipe 68 containing shut-off valve 70 and flow controller 192 to introduce a predetermined flow of reducing gas into the cooling reactor recirculation system. In order to prevent an undesired build-up of pressure within the cooling system, gas is removed from pipe 184 through a pipe 194 containing a back pressure regulator 196 for maintaining a desired pressure in the cooling system. The cooling gas removed through pipe 194 may flow either through pipe 198 containing valve 200 back to the header 66 or through pipe 202 containing valve 204 to the spent gas header 138.

In general, the use of the out-of-line cooling reactor increases the operating flexibility of the system since it permits independent control of both the gas flow rate and gas composition in the cooling gas loop.

As indicated above, it is often desirable to use as a cooling gas for cooling the hot ore a gas containing constituents capable of depositing a predetermined amount of carbon on the surface of the reduced sponge iron. Thus it may be desirable to use in the cooling cycle a gas having a somewhat different composition than that fed to the reduction reactors in order to achieve an optimum deposition of carbon on the sponge iron. To permit modification of the gas composition within the cooling reactor recirculating system, a branch pipe 206 containing a valve 208 is connected to the cooling gas recirculating pipe 190. As indicated in the drawing, any of various gases, e.g., carbon monoxide, methane, hydrogen, nitrogen or carbon dioxide may be introduced into the cooling gas loop through pipe 206, either in place of or in addition to the reformer product gas supplied to pipe 68. Thus with the system shown the composition of the cooling gas can be readily modified to effect a desired deposition of carbon on the surface of the reduced sponge iron particles. Also the rate of flow of the cooling gas can be varied over a relatively wide range independently of the rate of flow of reducing gas through the reduction reactors of the system.

A still further advantage of using the out-of-line cooling reactor is that the reducing gas from the reformer can be fed directly to the primary reduction reactor 12 without first passing through the bed of reduced metal in the cooling reactor. Since the pressure drop through the bed of metal being cooled in reactor 10 is not added to the pressure drops through the several reduction reactors of the system, it is possible economically to use three or more reduction reactors in series rather than the two reduction reactors used in prior systems. Thus the production of cooled and reduced sponge iron having a given degree of reduction per unit volume of reducing gas is increased and improved efficiency of utilization of the reducing gas is obtained.

Moreover, as pointed out above, when an "in-line" cooling reactor is used, there is a tendency during the later stages of the cooling process for the reforming reaction to go in the reverse direction, i.e., for carbon monoxide and hydrogen to react to form methane and water. The heat generated by this "reverse" reaction retards the cooling process. With the out-of-line cooling reactor of the present invention, methane can be introduced through pipe 206 into the cooling gas loop to suppress this undesired "reverse" reaction. Also nitrogen can be added to the cooling gas loop to reduce the amount of carbon deposited on the sponge iron. Carbon monoxide supplied to the cooling gas loop through pipe 206 tends to increase the deposition of carbon on the sponge iron, whereas carbon dioxide tends to decrease such deposition. If valve 70 is closed and hydrogen is supplied through pipe 206 as a cooling medium, a high degree of metallization is achieved with no carbon deposition. Thus the "out-of-line" location of the cooling reactor permits extensive operating flexibility.

As noted above, while the "out-of-line" cooling reactor of the present invention is especially useful in systems comprising three or more reduction reactors connected in series, it can also be used with advantage in one or more reduction reactor systems. Thus irrespective of the number of reduction reactors used, the "out-of-line" cooling reactor permits a wider range of variation of carbon deposition to be obtained in the cooling reactor and facilitates inhibition of the reverse reforming reaction in the cooling reactor.

It is, of course, to be understood that the foregoing description is intended to be illustrative only and that numerous changes can be made in the specific embodiment described without departing from the spirit of the invention as defined in the appended claims. For example, while the invention has been described as applied to the reduction of iron ore to sponge iron, it can also be used for the reduction of ores of other metals, e.g., copper, nickel and tin. Also instead of adding methane to the reduction reactor feed gas through pipe 134, methane can be fed through pipe 206 to the cooling reactor loop to form a circulating gas that is enriched with respect to methane, and this methane-enriched gas can be caused to flow through pipe 198 and pipe 66 to the primary reduction reactor heater 74.

If desired, all of the reformer product gas can be caused to flow through pipe 68 to the cooling reactor loop and a substantially equivalent flow of gas can be withdrawn through pipes 194 and 198 and used as feed reducing gas to the reduction reactors. While this mode of operation does not permit independent control of the gas composition in the cooling reactor and in the reduction reactors, it still provides an advantage over prior methods of operation since the pressure at the junction of pipes 198 and 66 can be made substantially equal to the pressure at the junction of pipe 66 and 68. Thus the pressure drop through the cooling reactor is neutralized and does not contribute to the overall pressure drop between the reformer discharge and the effluent gas from the last reduction reactor.

Other modifications within the scope of the invention will be apparent to those skilled in the art.

I claim:

1. In apparatus for the batchwise gaseous reduction of iron ore to sponge iron in a multiple reactor system of the type which comprises a plurality of reactors including a cooling reactor and a series of reduction reactors in which separate bodies of iron-bearing material are simultaneously treated, a source of reducing gas composed largely of carbon monoxide and hydrogen, a cooling gas loop including said cooling reactor, a pump for circulating cooling gas through said loop and a cooler for cooling the circulating gas, a first conduit interconnecting said source to said loop and a second conduit connecting said loop to the inlet of the first reduction reactor of said series, the improvement which comprises a third conduit directly interconnecting said first and second conduits outside said loop to by-pass said loop and minimize the pressure drop between said source and said first reduction reactor.

2. Apparatus according to claim 1 wherein said cooling reactor pump and cooler are so interconnected as to cause the circulating gas to flow successively through said pump, said reactor and said cooler, said first conduit is connected to said loop between said cooler and said pump and said second conduit is connected to said loop between said pump and said cooling reactor.

3. Apparatus for the gaseous reduction of metal ores to sponge metal of the type that includes a plurality of reactors including a cooling reactor and at least one reduction reactor in which separate fixed beds of metal-bearing material are simultaneously treated by a reducing gas supplied to said reactors from a source of such gas, said apparatus comprising in combination with said gas source and said reactors a cooling gas loop including said cooling reactor, a pump for circulating cooling gas through said loop and a cooler for cooling the circulating gas, a first conduit interconnecting said source to said loop, a secpond conduit connecting said loop to a reduction reactor, said second conduit including a heater for heating the gas flowing therethrough before it is supplied to said reactor, and a third conduit directly interconnecting said first conduit with said second conduit ahead of said heater to bypass said loop and minimize the pressure drop between said source and said reduction reactor.

4. Apparatus for the gaseous reduction of metal ores to sponge metal of the type that includes a plurality of reactors including a cooling reactor and a series of reduction reactors in which separate fixed beds of metal-bearing material are simultaneously treated by a reducing gas supplied to said reactors from a source of such gas, said apparatus comprising in combination with said gas source and said reactors, a cooling gas loop including said cooling reactor, a pump for circulating cooling gas through said loop and a cooler for cooling the circulating gas, a first conduit for connecting said gas source to said loop and a second conduit interconnecting said loop at a point between the discharge of said pump and said cooling reactor with the first reduction reactor of said series, said second conduit including a heater for heating the reducing gas flowing therethrough before it enters said first reduction reactor.

5. Apparatus for the gaseous reduction of metal ores to sponge metal of the type that includes a plurality of reactors including a cooling reactor and a series of reduction reactors in which separate fixed beds of metal-bearing material are simultaneously treated by a reducing gas supplied to said reactors from a source of such gas, said apparatus comprising in combination with said gas source and said reactors a cooling gas loop including said cooling reactor, a pump for circulating cooling gas through said loop and a cooler for cooling circulating gas, a first conduit interconnecting said gas source to said loop, a second conduit connecting said loop to the first reduction reactor of said series, said second conduit including a heater for heating the gas flowing therethrough before it is supplied to said first reactor, and a third conduit directly interconnecting said first and second conduits outside said loop to bypass said loop and minimize the pressure drop between said source and said first reduction reactor.

6. Apparatus according to claim 5 including a fourth conduit interconnecting the last reduction reactor of said searies and said second conduit ahead of said heater for recycling gas from the last reactor of said series to the first reactor of said series.

7. Apparatus according to claim 5 including a source of hydrocarbon gas and a fourth conduit connecting said hydrocarbon gas source to said second conduit ahead of said heater for enriching the reducing gas flowing to the first reduction reactor of said series.

8. Apparatus according to claim 5 wherein said cooling reactor, pump and gas cooler are so interconnected as to cause the circulating gas to flow successively through said pump, said reactor and said cooler, said first conduit is connected to said loop between said cooler and said pump and said second conduit is connected to said loop between said pump and said cooling reactor.

* * * * *